US010253622B2

(12) United States Patent
Jaaskelainen et al.

(10) Patent No.: US 10,253,622 B2
(45) Date of Patent: Apr. 9, 2019

(54) DATA TRANSMISSION ACROSS DOWNHOLE CONNECTIONS

(71) Applicant: Halliburton Energy Services, Inc., Houston, TX (US)

(72) Inventors: Mikko Jaaskelainen, Katy, TX (US); Brian Vandellyn Park, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/775,715

(22) PCT Filed: Dec. 16, 2015

(86) PCT No.: PCT/US2015/065943
§ 371 (c)(1),
(2) Date: May 11, 2018

(87) PCT Pub. No.: WO2017/105418
PCT Pub. Date: Jun. 22, 2017

(65) Prior Publication Data
US 2018/0347348 A1     Dec. 6, 2018

(51) Int. Cl.
*E21B 47/16*     (2006.01)
*E21B 41/00*     (2006.01)
(Continued)

(52) U.S. Cl.
CPC .......... *E21B 47/16* (2013.01); *E21B 41/0085* (2013.01); *E21B 47/18* (2013.01); *G01S 15/8965* (2013.01)

(58) Field of Classification Search
CPC ........ E21B 47/01; E21B 47/123; E21B 47/14; E21B 47/16; E21B 47/18; E21B 41/0085; G01V 11/002; G01S 15/8965
See application file for complete search history.

(56) References Cited

U.S. PATENT DOCUMENTS 5,592,438 A * 1/1997 Rorden ................ E21B 47/101
340/854.3
5,886,303 A * 3/1999 Rodney .................... G01V 1/46
181/102
(Continued)

FOREIGN PATENT DOCUMENTS

WO     2012010821 A2     1/2012

OTHER PUBLICATIONS

International Search Report and the Written Opinion for International Application No. PCT/US2015/065943 dated Aug. 29, 2016, 19 pages.

*Primary Examiner* — Orlando Bousono
(74) *Attorney, Agent, or Firm* — Chamberlain Hrdlicka

(57) ABSTRACT

Various embodiments include methods and systems structured to transmit data from downhole sensors to the surface at a well site. The transmission can be implemented to overcome downhole connections that can act as obstructions to direct electrical and optical communication in a wellbore. Electrical signals from one or more sensors in a sensor unit, located on a side of a downhole connection in a wellbore opposite the surface of the wellbore, can be used to drive an acoustic transmitter to transmit an acoustic signal via a production string or casing or fluid in the production string or casing across the downhole connection, where the acoustic signal is received on the surface side of the downhole connection. Data correlated to the received acoustic signal can be provided to a surface location of the wellbore. Additional apparatus, systems, and methods can be implemented in a variety of applications.

21 Claims, 6 Drawing Sheets

(51) Int. Cl.
*E21B 47/18* (2012.01)
*G01S 15/89* (2006.01)

(56) References Cited

U.S. PATENT DOCUMENTS

| | | | |
|---|---|---|---|
| 5,941,307 A * | 8/1999 | Tubel | E21B 34/066 166/313 |
| 5,995,449 A * | 11/1999 | Green | E21B 23/04 340/853.3 |
| 6,026,913 A * | 2/2000 | Mandal | E21B 47/02208 175/45 |
| 6,065,538 A | 5/2000 | Reimers et al. | |
| 6,208,585 B1 * | 3/2001 | Stroud | G01V 13/00 367/14 |
| 6,310,829 B1 * | 10/2001 | Green | E21B 23/04 166/386 |
| 6,354,146 B1 * | 3/2002 | Birchak | E21B 47/101 73/61.79 |
| 6,400,646 B1 * | 6/2002 | Shah | E21B 47/16 367/79 |
| 6,442,105 B1 * | 8/2002 | Tubel | E21B 43/12 340/854.3 |
| 6,837,332 B1 * | 1/2005 | Rodney | G01V 1/48 181/0.5 |
| 8,319,657 B2 | 11/2012 | Godager | |
| 8,469,084 B2 | 6/2013 | Clark et al. | |
| 9,000,942 B2 | 4/2015 | Atkinson et al. | |
| 2001/0043509 A1 * | 11/2001 | Green | E21B 23/04 367/81 |
| 2002/0149499 A1 * | 10/2002 | Beique | E21B 17/14 340/854.5 |
| 2002/0149500 A1 * | 10/2002 | Beique | E21B 17/14 340/854.5 |
| 2002/0149501 A1 * | 10/2002 | Beique | E21B 17/14 340/854.5 |
| 2002/0154027 A1 * | 10/2002 | Beique | E21B 17/14 340/854.5 |
| 2002/0154028 A1 * | 10/2002 | Beique | E21B 17/14 340/856.3 |
| 2003/0010495 A1 * | 1/2003 | Mendez | E21B 47/0905 166/255.1 |
| 2003/0015319 A1 * | 1/2003 | Green | E21B 23/04 166/250.01 |
| 2003/0043055 A1 * | 3/2003 | Schultz | E21B 41/0085 340/856.3 |
| 2003/0048198 A1 * | 3/2003 | Schultz | E21B 41/0085 340/853.3 |
| 2003/0235113 A1 * | 12/2003 | da Silva | G01V 1/46 367/13 |
| 2004/0207539 A1 * | 10/2004 | Schultz | G01V 3/18 340/854.3 |
| 2005/0022987 A1 * | 2/2005 | Green | E21B 23/04 166/250.17 |
| 2005/0024231 A1 * | 2/2005 | Fincher | E21B 17/028 340/854.4 |
| 2005/0207279 A1 * | 9/2005 | Chemali | E21B 17/028 367/83 |
| 2005/0224229 A1 * | 10/2005 | Blacklaw | E21B 47/0006 166/253.1 |
| 2006/0071809 A1 * | 4/2006 | Beique | E21B 17/14 340/854.5 |
| 2007/0030762 A1 * | 2/2007 | Huang | E21B 47/182 367/83 |
| 2007/0227776 A1 * | 10/2007 | Huang | E21B 41/0085 175/42 |
| 2007/0280049 A1 * | 12/2007 | Patterson | G01V 1/523 367/35 |
| 2008/0130412 A1 * | 6/2008 | Fink | G01V 11/002 367/82 |
| 2008/0247273 A1 | 10/2008 | Chemali et al. | |
| 2010/0097887 A1 * | 4/2010 | Patterson | G01V 1/523 367/35 |
| 2010/0107754 A1 * | 5/2010 | Hartog | E21B 47/101 73/152.47 |
| 2011/0139447 A1 * | 6/2011 | Ramos | E21B 47/09 166/254.2 |
| 2011/0164468 A1 * | 7/2011 | Robbins | E21B 47/16 367/82 |
| 2011/0176387 A1 * | 7/2011 | Froelich | E21B 47/16 367/82 |
| 2011/0205080 A1 * | 8/2011 | Millot | E21B 47/16 340/854.4 |
| 2011/0205847 A1 * | 8/2011 | Lemenager | E21B 47/122 367/82 |
| 2012/0013893 A1 * | 1/2012 | Maida | E21B 47/123 356/73.1 |
| 2012/0126992 A1 * | 5/2012 | Rodney | E21B 33/0355 340/850 |
| 2012/0146805 A1 * | 6/2012 | Vick, Jr. | G01V 11/002 340/853.2 |
| 2012/0224455 A1 * | 9/2012 | Dorovsky | G01V 11/00 367/35 |
| 2013/0021874 A1 * | 1/2013 | Hartog | E21B 47/101 367/31 |
| 2014/0022537 A1 * | 1/2014 | Samson | E21B 47/123 356/73.1 |
| 2014/0126331 A1 * | 5/2014 | Skinner | G01V 1/40 367/82 |
| 2014/0150523 A1 * | 6/2014 | Stokely | E21B 47/123 73/1.82 |
| 2014/0219056 A1 | 8/2014 | Samson et al. | |
| 2014/0260589 A1 * | 9/2014 | Hallundbæk | E21B 47/101 73/152.32 |
| 2014/0375467 A1 * | 12/2014 | Lilly | E21B 47/122 340/854.4 |
| 2015/0003202 A1 * | 1/2015 | Palmer | E21B 47/16 367/82 |
| 2015/0159478 A1 * | 6/2015 | Georgi | E21B 47/02208 367/83 |
| 2015/0267533 A1 * | 9/2015 | Millot | E21B 47/16 340/854.4 |
| 2015/0275657 A1 * | 10/2015 | Deffenbaugh | E21B 47/14 340/854.4 |
| 2015/0285065 A1 * | 10/2015 | Howell | E21B 47/0005 367/82 |
| 2015/0285066 A1 * | 10/2015 | Keller | E21B 47/011 367/82 |
| 2015/0285937 A1 * | 10/2015 | Keller | G01V 1/40 367/82 |
| 2015/0292319 A1 * | 10/2015 | Disko | E21B 47/14 367/82 |
| 2015/0292320 A1 * | 10/2015 | Lynk | E21B 47/123 367/82 |
| 2015/0292321 A1 * | 10/2015 | Keller | E21B 47/12 367/81 |
| 2015/0300159 A1 * | 10/2015 | Stiles | E21B 47/0005 367/82 |
| 2015/0322782 A1 * | 11/2015 | Khajeh | E21B 49/10 166/250.01 |
| 2015/0354351 A1 * | 12/2015 | Morrow | E21B 47/01 367/82 |
| 2015/0377016 A1 * | 12/2015 | Ahmad | E21B 47/16 340/855.8 |
| 2016/0108730 A1 * | 4/2016 | Fanini | G01V 1/44 73/152.42 |
| 2016/0208605 A1 * | 7/2016 | Morrow | E21B 43/122 |
| 2016/0215612 A1 * | 7/2016 | Morrow | E21B 47/01 |
| 2016/0281496 A1 * | 9/2016 | Hyland | E21B 47/122 |

* cited by examiner

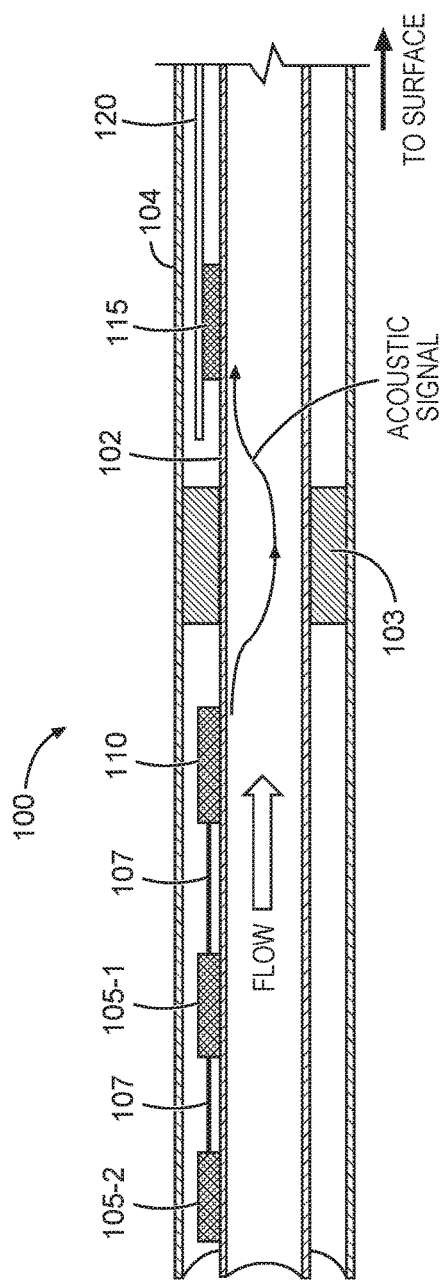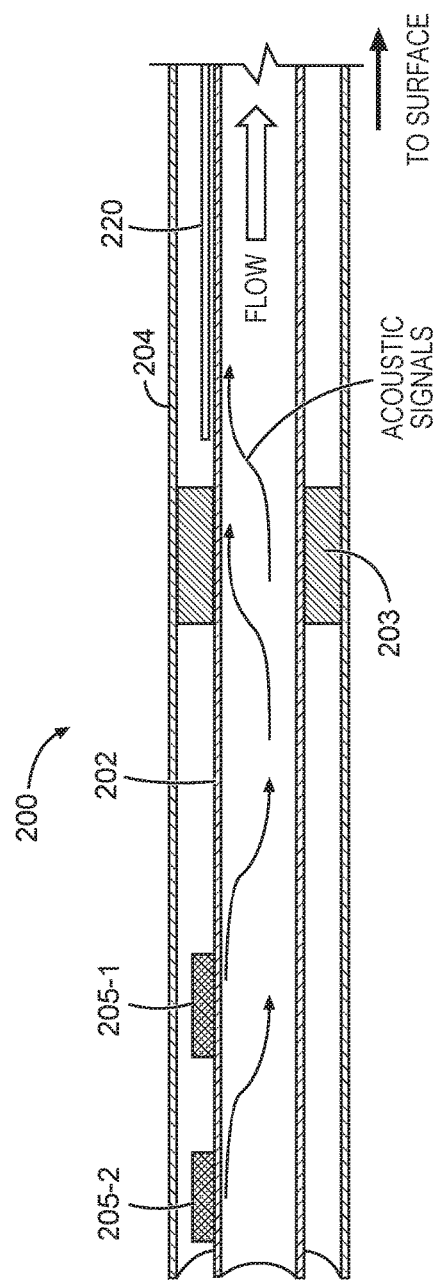

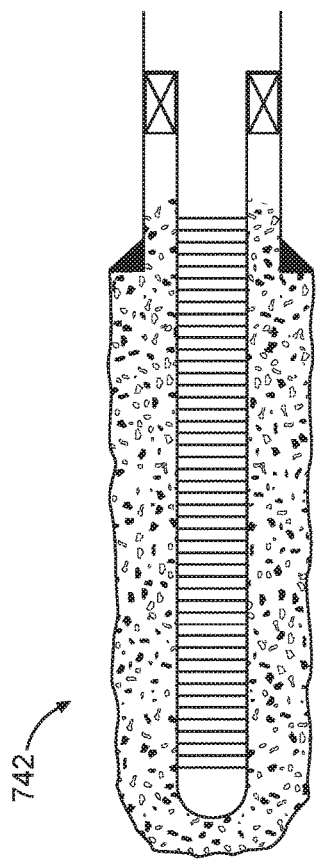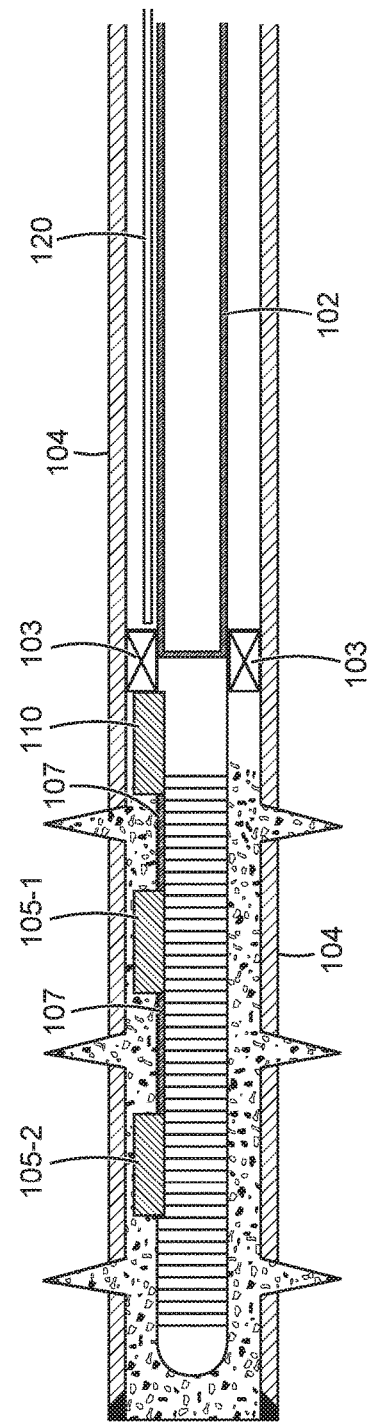

DATA TRANSMISSION ACROSS DOWNHOLE CONNECTIONS

TECHNICAL FIELD

The present invention relates generally to systems and methods related to oil and gas exploration.

BACKGROUND

In drilling wells for oil and gas exploration, the environment in which drilling tools and production components operate is at significant distances below the surface. Due to harsh environments and depths in which drilling in formations is conducted, enhanced efficiencies to post drilling operations are desirable. Such post drilling operations include making measurements downhole and communicating signals and/or data from such measurements to the surface at the well site.

The instrumentation of production strings using fiber optics based distributed systems such as distributed temperature sensing (DTS), distributed acoustic sensing (DAS), and other sensing systems based on for example interferometric sensing is well established. Optical fiber can be run on the outside of tubing and/or casing to the surface, where interrogators detect reflected light from the entire length of the fiber and/or single/multi point sensors. However, there are connections in the production string which prevent, or make difficult, fiber from being installed over the entire length of the string. In some cases, such difficulties may be overcome by using wet or dry fiber connects, although these connects have their own limitations. In other cases, such as with swivels, fiber can be wound around a collar like a spring so that it has some rotation flexibility, but this too has manufacturing and operational problems. There are also cases where sensors currently cannot be installed, such as in multi-lateral wells. In other cases, slips and packers clamp to the liners and prevent passage of the fiber.

BRIEF DESCRIPTION OF THE DRAWINGS

FIG. 1 is a schematic of an example electro acoustical technology system with respect to a downhole obstruction, in accordance with various embodiments.

FIG. 2 is a schematic of an example electro acoustical technology system with respect to a downhole obstruction, in accordance with various embodiments.

FIGS. 7A-B are a representation of an example application of components of the electro acoustical technology system of FIG. 1 to an open hole and cased hole gravel pack, in accordance with various embodiments.

DETAILED DESCRIPTION

Figure 3:
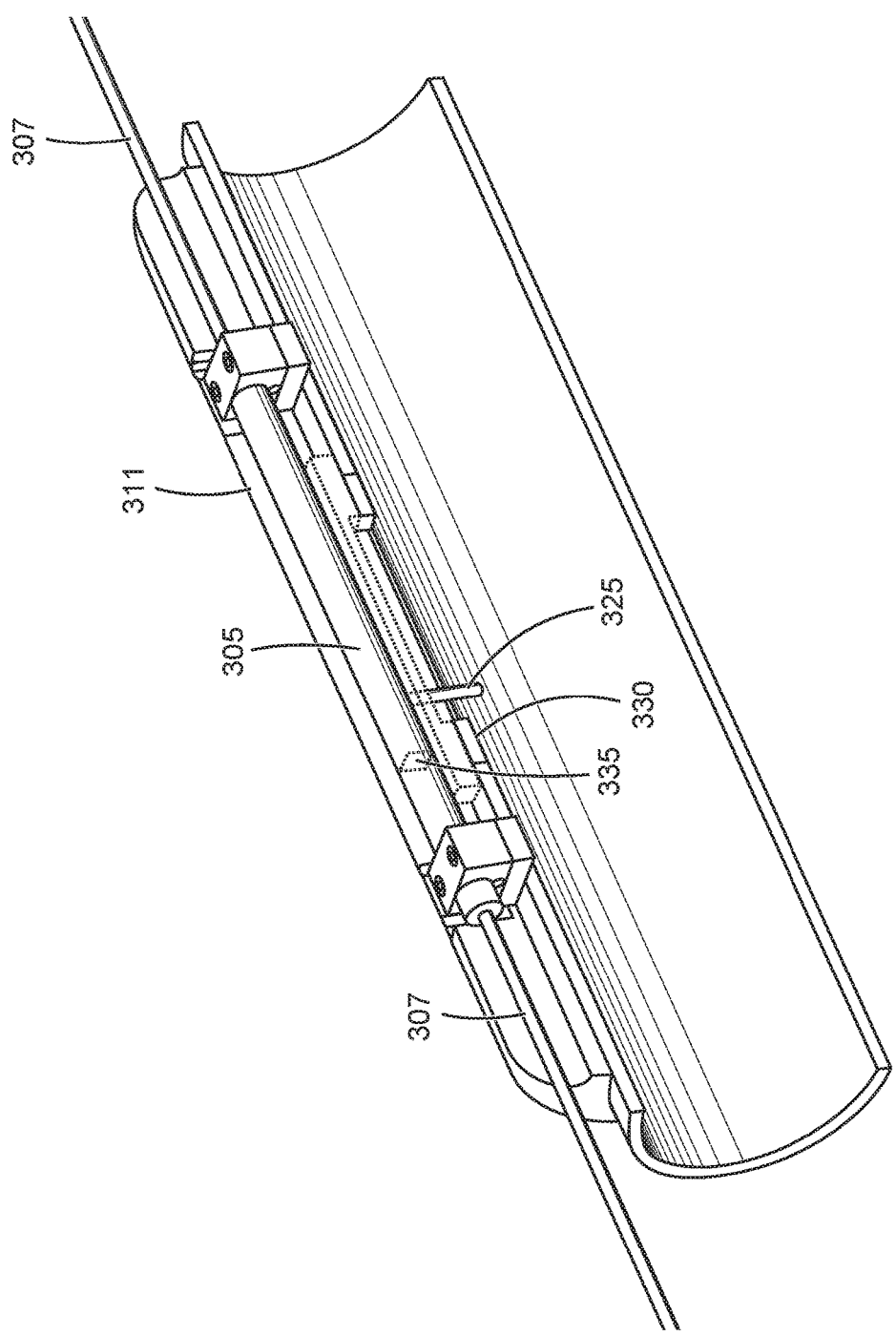
FIG. 3 is a schematic of an example electro acoustical technology wired sensor, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a mechanism is provided to transmit data across downhole devices, where direct electrical or optical transmission is not possible. Such connections include, but are not limited to, couplings, packers, exit windows, hangers, latch keys, shock absorbers, swivels, and bridge plugs. Such a mechanism can be based on electro acoustical technology (EAT) adapted for this application. Depending on its application, EAT technology can be realized as a sensor that can convert output from such a sensor into an electrical frequency, where the electrical frequency can be used to drive a transducer, for example, a piezoelectric ceramic that can then generate an acoustic signal having an acoustic frequency. In several configurations, the acoustic signal can be detected with a distributed acoustic sensing system or any other fiber optic sensing system. In various embodiments, multiple sensors can be disposed downhole in a lower completion in which signals from the sensors can be electrically communicated to a transmission module that then communicates through a small gap onto an optical fiber. Piezo electric transmission and reception, vortex energy harvesting and storage, and various sensors such as pressure, temperature, fluid flow, and so on can be used.

With the development of EAT technology, point sensing is also possible by transmitting data from a sensor using acoustic and/or vibrational sources such as, for example, piezo electric transmitters, which send data streams that are captured by optical sensing systems via, for example, an fiber optic line to the surface. Apparatus, as taught herein, provides a novel arrangement including a version of EAT technology that enables sensor data to be transmitted over relatively short distances by an EAT transmitter via fluid in the well, the production string itself, or casing, which can bypass an obstruction. (An obstruction makes direct electrical transmission and optical transmission across the obstruction unavailable or impractical.) The data can then be detected above the blockage by an EAT receiver. Such an EAT receiver may be an electrical device that can detect the signal and couple it to a fiber optic system or such an EAT receiver may include an optical sensor that can detect the signal and relay it to the surface using fiber technology. Each of these type of EATs may be autonomous in terms of energy by harvesting with its own vortex harvester, and may be capable of performance without any energy source from the surface. A vortex harvester is a device that uses vortex induced vibrations from fluids to create mechanical energy that is converted to electrical energy, for example, by a piezoelectric device. Batteries may also be used. In addition, the EAT may have a power save mode such that it can "wake up" periodically to take a measurement and transmit data to the surface. Thus, such EATs need no connection through the obstruction, as can be seen in FIG. 1, for example.

FIG. 1 is a schematic of an embodiment of an example EAT system 100 with respect to a downhole obstruction 103 on a production string 102 within casing 104, where EAT system 100 includes an EAT transmitter 110 and an EAT receiver 115. In FIG. 1, two EAT sensors 105-1, 105-2 are shown, although more can be implemented. Each EAT device can be self-powered, receiving energy from the fluid flow using, for example, vortex harvesters, which can be used to charge batteries that power electronics of the respective EAT device. In the configuration shown for EAT system 100, EAT sensors 105-1 and 105-2 are shown electrically connected to the EAT transmitter 110 by electrical connections 107. However, sensors 105-1 and 105-2 can contain their own transmitters and be wireless, in which case the EAT transmitter 110 would not be needed. The data from each of the EAT sensors 105-1 and 105-2 can be transmitted at different frequencies so that the data signals can be distinguished by the EAT receiver 115, or the data from each of the EAT sensors 105-1 and 105-2 can be time division multiplexed with a unique identifier.

The EAT transmitter 110 may also be powered by a vortex harvester, making it autonomous in terms of power resources and would need no connection to the surface. The EAT transmitter 110 can take the data received from the EAT sensors 105-1 and 105-2 downhole and convert the data to an acoustic transmission. For example, the EAT transmitter 110 can be realized using a piezoelectric transmitter. The acoustic energy travels up-hole, either through the fluid or through the production string 102, where it is detected in the EAT receiver 115 device or by a fiber optic sensor. The EAT receiver 115 can be implemented with a piezoelectric receiver. With a fiber optic sensor used, it can be located where the EAT receiver 115 is located in FIG. 1. The fiber optic sensor may be, for example, a coil of fiber connected to a DAS fiber 120. The DAS fiber 120 can be part of a DAS fiber system where coherent Rayleigh scattering is used to detect the acoustic signal and/or vibrations or any other type of interferometer based on, for example, Michelson, Mach-Zehnder, Fabry-Perot principles etc.

If the data is received by the EAT receiver 115, the EAT receiver 115 can record and amplify the information, and transmit the data to an optical fiber sensing system such as DAS fiber 120. Using the optical fiber sensing system, the data can be transmitted to the surface at the speed of light. The data may be analog or digital. The EAT receiver 115 may use lead zirconate titanate (PZT), which is a piezoelectric ceramic material, for power harvesting and/or data transmission and/or to receive the data given the unique properties of PZTs.

If transmitters in the EAT sensors 105-1 and 105-2 are powerful enough, and the distances are limited, the need for the electrical connections between them and for the EAT transmitter 110 and the EAT receiver 115 may be unnecessary, such that the acoustic signals can be picked up directly by an optical fiber sensing system such as the DAS fiber 120. This can simplify the system. See FIG. 2, for example.

FIG. 2 is a schematic of an embodiment of an example EAT system 200 having EAT sensors 205-1, 205-2 with respect to a downhole obstruction 203 on a production string 202 within casing 204. In FIG. 2, two EAT sensors 205-1, 205-2 are shown, although more can be implemented. The EAT sensors 205-1 and 205-2 can be structured in a configuration as a flow sensor with a transmitter that is not directly coupled to a DAS fiber 220. Instead the EAT sensors 205-1 and 205-2 can be coupled to the production string 202, such as to a collar, and hence to the fluid. The transmitter of each of the EAT sensors 205-1 and 205-2 can be realized by a piezo electric transmitter. For one or both of the EAT sensors 205-1 and 205-2, a vortex harvester can be used to detect fluid velocity, while pressure and temperature can be measured using sensors in a welded recess of each of the EAT sensors 205-1 and 205-2. In an embodiment, direct wiring can be used such that the transmitter of the EAT sensor 205-2 can be replaced by a cable passing up the well to the next sensor or transmitter such as the EAT sensor 205-1. Alternatively, direct wiring can be used with EAT sensors having transmitters, which can allow for redundancy of communication paths. For more than two EAT sensors below the obstruction in the configuration of FIG. 2, all of the EAT sensors can be coupled by an electrical connection with the EAT sensor closest to the obstruction 203 having a transmitter. Numerous sensors can be wired or made to transmit acoustic data at different frequencies.

FIG. 3 is a schematic of an example EAT wired sensor 305. The EAT wired sensor 305 include pressure and/or temperature sensors 330 and a vortex harvester/velocity sensor 325. Such a multi-component structure can be considered to make such an EAT sensor structured as a sensor unit. The vortex harvester/velocity sensor 325 can provide power to electronics 335 to power the EAT wired sensor 305. The electronics 335 can include a battery operatively charged by the vortex harvester/velocity sensor 325. The vortex harvester/velocity sensor 325 can be realized by a piezoelectric crystal in which the occurrence of the vortex causes the harvester to vibrate at right angles to the flow, where the frequency of vibration is proportional to the velocity of the fluid. The velocity can be determined from the frequency of the vibration. A molded shroud 311 can be coupled to the EAT wired sensor 305 to provide protection to the EAT wired sensor 305. With the EAT wired sensor 305 attached onto a mandrel of a production string or casing, the molded shroud 311 provides protection as the EAT wired sensor 305 is run in the hole. The EAT wired sensor 305 screwed can be coupled to an electrical cable 307.

Figure 4:
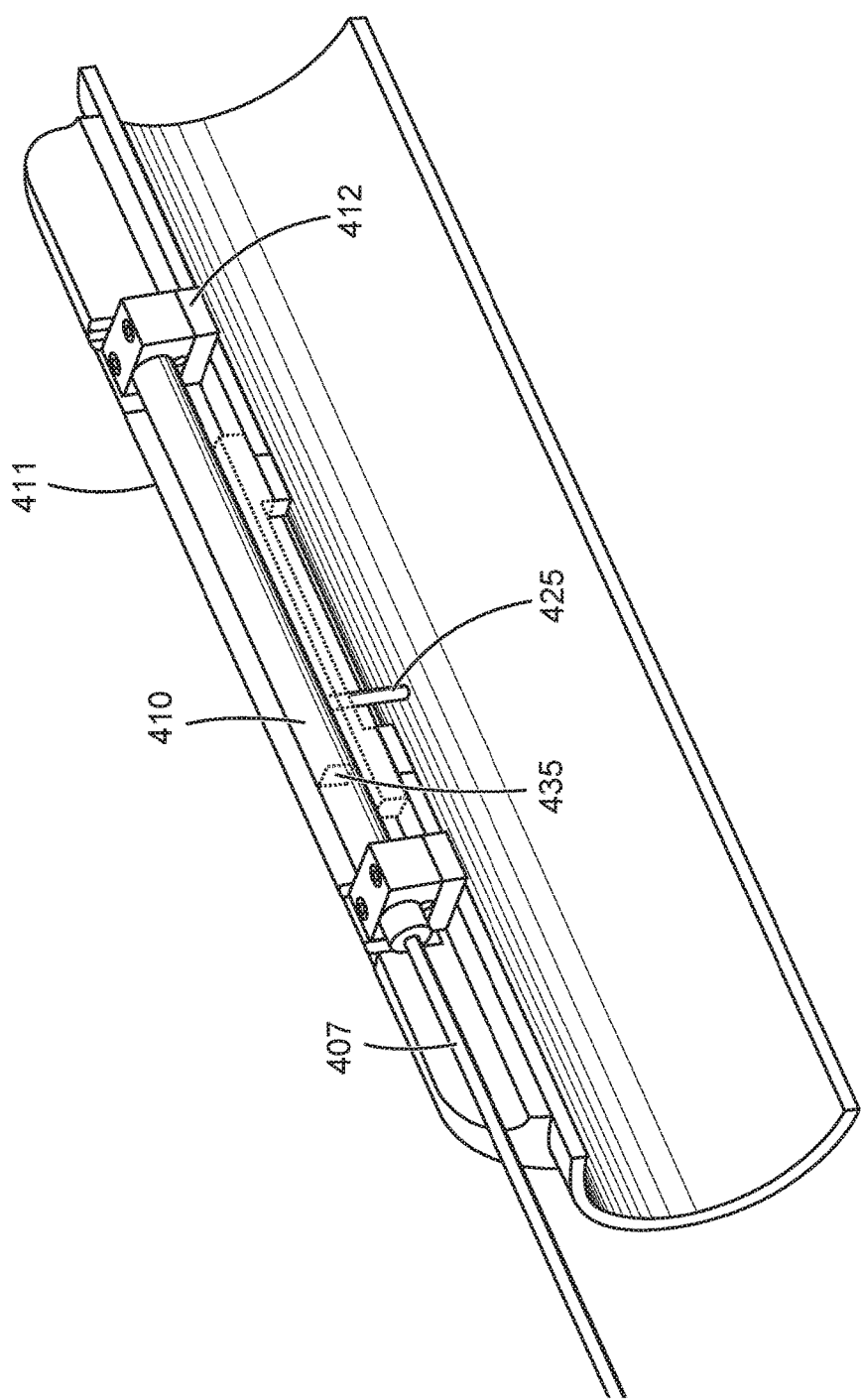
FIG. 4 is a schematic of an example electro acoustical technology transmitter, in accordance with various embodiments.

FIG. 4 is a schematic of an embodiment of an example EAT transmitter 410. The EAT transmitter 410 may or may not have sensors. The EAT transmitter 410 can be connected to sensors down hole by an electrical wire 407 such as shown in FIG. 1, for example. It may have its own vortex harvester 425 for power, or it can share power with EAT sensing modules along the electrical cable 407. The vortex harvester 425 can provide power to electronics 435 to power the EAT transmitter 410. The electronics 435 can include a battery operatively charged by the vortex harvester 425. The EAT transmitter 410 may transmit data with a transmitter component coupled to a collar of a production string or casing and hence the fluid with the production string or casing. Such a transmitter component may include, for example, a piezoelectric transmitter 412. A molded shroud 411 can be coupled to the EAT transmitter 410 to provide protection to the EAT transmitter 410. In a configuration, such as the configuration of FIG. 1, the EAT transmitter 410 can be located as close to the obstruction, such as obstruction 103 of FIG. 1, as possible. Though FIG. 4 shows separate vortex harvester and piezoelectric transmitter, in some embodiments they may be combined into one device.

EAT modules below an obstruction may also be able to receive commands that can be used to control sensors of each respective EAT module. For example, the EAT module can be used to control the read rate of the sensors in case, for example, interventions or other well treatments are planned. Commands may be transmitted from the surface. The commands may be pressure pulses and/or acoustic pulses. Communication with the EAT modules may also be conducted using slickline, wireline, coiled tubing, or other means where the distance between the source and EAT modules can be minimized.

Figure 5:
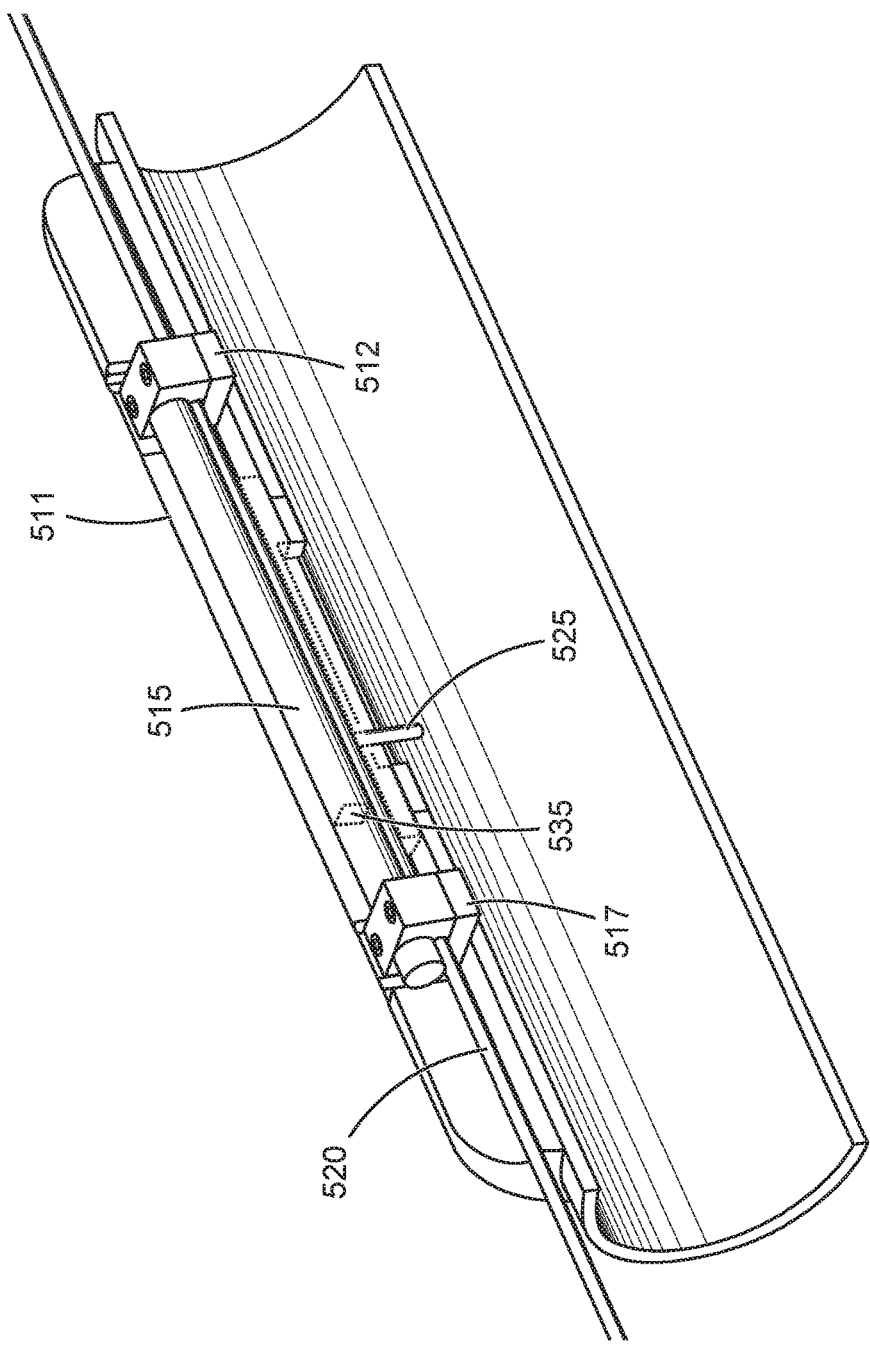
FIG. 5 is a schematic of an example electro acoustical technology receiver, in accordance with various embodiments.

FIG. 5 is a schematic of an example EAT receiver 515. In various embodiments, an EAT receiver 515 may or may not contain sensors. The EAT receiver 515 can have a piezoelectric receiver 517, which detects acoustic transmissions of a EAT transmitter module or EAT based sensors down hole that may be separated from the EAT receiver 515 by an obstruction. The EAT receiver 515 can be coupled to a DAS fiber or DAS fiber cable 520 and can transmit data it received to the DAS fiber cable 520. The data can be coupled onto the DAS fiber cable 520 by a transmitter component such as a piezo transmitter 512. It may also have a vortex harvester 525. The vortex harvester 525 can provide power to electronics 535 to power the EAT receiver 515. The electronics 535 can include a battery operatively charged by the vortex harvester 525. A molded shroud 511 can be coupled to the EAT receiver 515 to provide protection to the EAT receiver 515. In a configuration, such as the configuration of FIG. 1, the EAT receiver 515 may be mounted above the obstruction as close to it as possible, such as obstruction 103 of FIG. 1. FIG. 5 shows separate vortex harvester and piezo transmitter/receiver, which may be combined into one device in some embodiments.

The example EAT modules in FIGS. 3-5 can be attached to a conduit placed in a region of interest. The conduit may be a section of a sand screen, production string, tubing, a casing, or part of a molded mandrel that attaches in the production string. The mandrel may also be machined from a solid workpiece, but a molded mandrel is cheaper and quicker to make. For an energy harvester associated with an EAT module, a welded or machined recess in the pipe may be constructed for the energy harvester.

As can be seen from the discussions above, the various components of the EAT structures can be implemented in different arrangements to allow for data transmission across downhole connections. In various embodiments, a system comprises: a sensor unit coupled to a production string or casing in a wellbore, the sensor unit having one or more sensors, the sensor unit operable to output an electrical signal indicative of a parameter measured by the one or more sensors; an electroacoustic transmitter coupled to the production string or casing in the wellbore and structured to transmit an acoustic signal via the production string or casing or fluid in the production string or casing, the acoustic signal correlated to the electrical signal; and an acoustic receiver coupled to the production string or casing above the electroacoustic transmitter with respect to fluid flow to a surface location, the acoustic receiver separated from the electroacoustic transmitter by a downhole connection that obstructs direct electrical transmission and optical transmission between the electroacoustic transmitter and the acoustic receiver, the acoustic receiver device operable to receive the acoustic signal.

The acoustic receiver of the system or a similar system can include an acoustic receiver arranged to amplify data in the acoustic signal and transmit the amplified data to an optical fiber system or a fiber optic sensor coupled to the optical fiber system. The optical fiber system can include a distributed acoustic sensing system. The sensor unit can include a vortex harvester to provide energy to the sensor unit from flow of fluid in the production string or casing. The vortex harvester can be structured to operably detect fluid velocity. The one or more sensors of the system or a similar system can include temperature and pressure sensors.

The system or a similar system can include one or more additional sensor units, each additional sensor unit having one or more sensors, the one or more additional sensor units coupled to the production string or casing and arranged to provide electrical signals, having sensor data, to the electroacoustic transmitter for acoustic transmission of the sensor data across the downhole connection, the electrical signals being generated at a frequency different from that of the other sensor units or the electrical signals being time multiplexed with a unique identifier for each electrical signal.

The acoustic receiver of the system or a similar system can include a distributed acoustic sensing system to receive the acoustic signal directly from the production string or casing or the fluid in the production string or casing. The electroacoustic transmitter of the system or a similar can be electrically connected to the sensor unit to share an operating power source or the electroacoustic transmitter includes a vortex harvester to provide energy to the electroacoustic transmitter from flow of fluid in the production string or casing.

The acoustic receiver of the system or a similar system can include a piezoelectric receiver to receive the acoustic signal and a piezoelectric transmitter to transmit a representation of the acoustic signal to a distributed acoustic sensing system.

Figure 6:
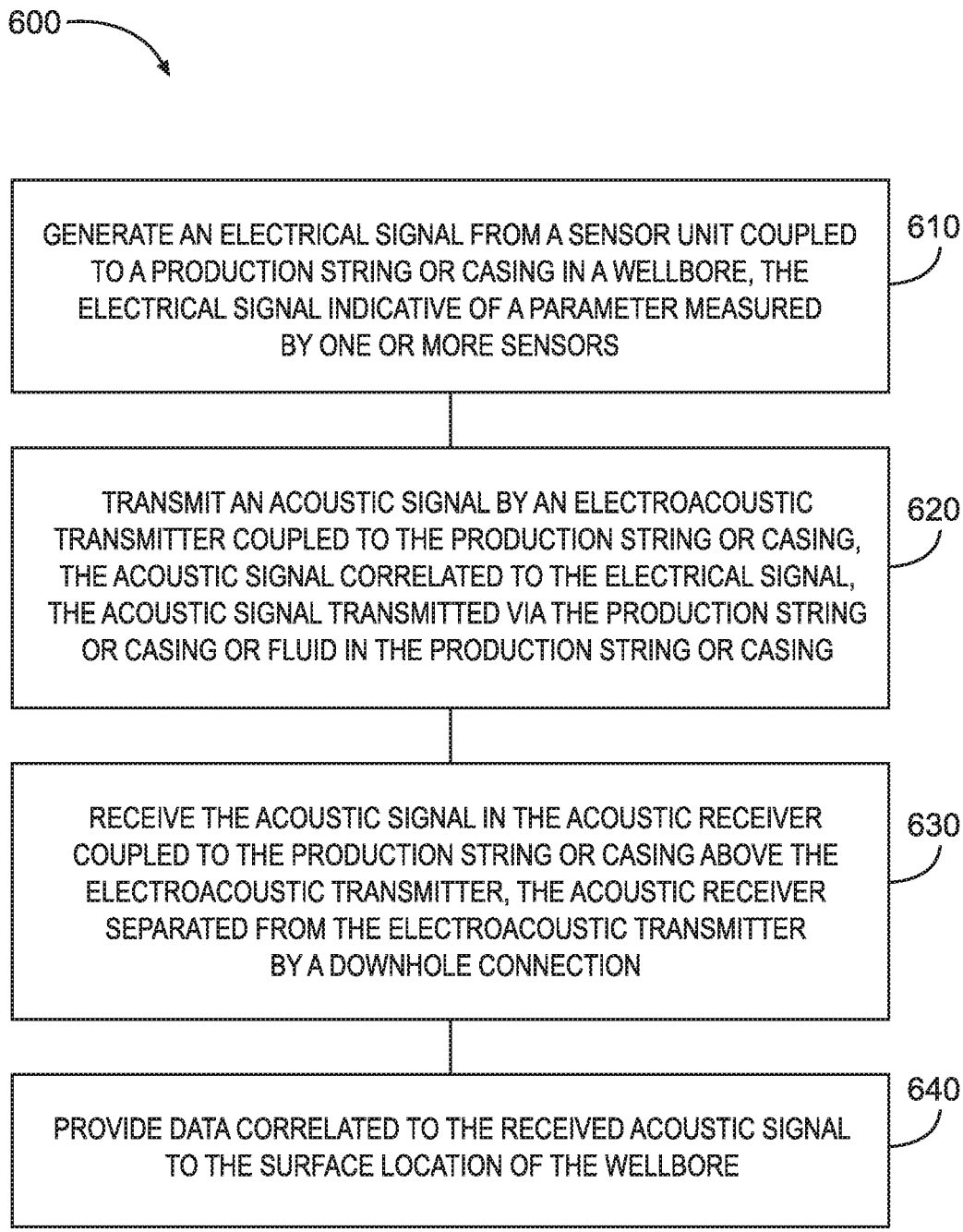
FIG. 6 is a flow diagram of features of an example method of transmitting data across downhole connections, in accordance with various embodiments.

FIG. 6 is a flow diagram of features of an embodiment of an example method 600 of transmitting data across downhole connections. At 610, an electrical signal is generated from a sensor unit coupled to a production string or casing in a wellbore, the electrical signal indicative of a parameter measured by one or more sensors. The one or more sensors are part of the sensor unit. At 620, an acoustic signal is transmitted by an electroacoustic transmitter coupled to the production string or casing, the acoustic signal correlated to the electrical signal, the acoustic signal transmitted via the production string or casing or fluid in the production string or casing. At 630, the acoustic signal is received in an acoustic receiver coupled to the production string or casing above the electroacoustic transmitter, the acoustic receiver separated from the electroacoustic transmitter by a downhole connection. The acoustic receiver is above the electroacoustic transmitter with respect to fluid flow to a surface location and the downhole connection obstructs direct electrical transmission and optical transmission between the electroacoustic transmitter and the acoustic receiver.

At 640, data correlated to the received acoustic signal to the surface location of the wellbore is provided. Providing data correlated to the received acoustic signal to the surface location of the wellbore can include using an optical fiber system to transmit the data to the surface location. Providing data correlated to the received acoustic signal to the surface location can include using a distributed acoustic sensing system that receives the data in acoustic form. Using the distributed acoustic sensing system can include applying an interferometric technique. Applying an interferometric technique can include using coherent Rayleigh scattering. Receiving the acoustic signal in the acoustic receiver can include receiving the acoustic signal in an acoustic receiver coupled to the distributed acoustic sensing system.

Method 600 or methods similar to method 600 can include generating the electrical signal from the sensor unit and transmitting the acoustic signal can include transmitting the acoustic signal from a electroacoustic transmitter integrated in the sensor unit; and receiving the acoustic signal can include receiving the acoustic signal in an distributed acoustic sensing system separated from the sensor unit by the downhole connection in the production string or casing. Such methods can include converting an electrical signal, from a second sensor unit coupled to the sensor unit by electrical wiring, to an acoustic signal containing data from one or more sensors of the second sensor unit, and transmitting an acoustic signal containing the data from the one or more sensors of the second sensor unit across the downhole connection.

Method 600 or methods similar to method 600 can include powering the sensor unit by a vortex harvester that provides energy to the sensor unit from flow of fluid in the production string or casing.

Method 600 or methods similar to method 600 can include generating a plurality of acoustic signals from conversion of electrical signals by one or more additional sensor units coupled to the production string or casing, each additional sensor unit having one or more sensors, the electrical signals being generated at a frequency different from that of the other sensor units or the electrical signals being time multiplexed with a unique identifier for each electrical signal.

Method 600 or methods similar to method 600 can include receiving commands in the sensor unit to control the one or more sensors.

Systems, as taught herein, leverage the EAT sensor instrumentality to add an EAT transmitter and EAT receiver, which enables data to be transmitted across downhole devices that would otherwise block data transmission and power. An example of where this technology could be used is in upper/lower completions in Gulf of Mexico (GOM) gravel packs for example. Such systems can enable real time data to be collected in parts of the well that were previously unable to measure, collect or transmit data, such as in lateral wells, below bridge plugs, swivels, shock absorbers, latch keys, hangers, packers, couplings and junctions.

Systems, as taught herein, allow for bypassing the need for wet or dry connects in some instances, where distributed fiber optic data is not required below the connection. The advantage of the technology and configurations is that many single point sensors can be used and the placement of the sensors is very flexible. Current electrical systems are often limited by the number of sensors whereas the arrangements, taught herein, may enable greater reservoir coverage thus resulting in optimized production and real-time monitoring, such as enabling real time flow, temperature and pressure measurements in downhole locations that were not previously measurable due to obstructions in the well. It makes the inaccessible accessible and measureable.

FIGS. 7A-B are a representation of an example application of components of the electro acoustical technology system 100 of FIG. 1 to an open hole gravel pack. FIG. 7A is an illustration of an open hole gravel pack completion 742 with a sand screen (shown as a pipe with stripes) and sand. No EAT system is shown. FIG. 7B is an illustration of a cased hole gravel pack with a casing 104 that has been perforated, sand screen (shown as a pipe with stripes), sand, and an EAT system. Production tubing 102 provides an upper completion/production tubing that can be connected to a lower completion provided the cased-hole gravel pack. Device/connection 103 may be a packer/hydraulic wet connect that can include a packer/lower wet mate and an upper wet-mate connector, where such a wet connect would tie the lower completion to the upper completion/production tubing. EAT sensors 105-1 and 105-2 electrically connected to EAT transmitter 110 by electrical connections 107 are disposed in the lower completion and fiber cable 120 is disposed in the upper completion/production tubing region. Various alternative arrangements of components of an electro acoustical technology system as taught herein can be used in configurations similar to that of FIG. 7B. For example, an EAT receiver can be used in conjunction with fiber cable 120. Further, the configuration of FIG. 2 may be applied to the open hole gravel pack of FIG. 7A. In addition, the EAT system shown in FIG. 7B can be implemented in FIG. 7A. FIGS. 7A-B are but one example of the implementation of EAT components as taught herein.

The following are example embodiments of methods and systems in accordance with the teachings herein.

A method 1 can comprise: generating an electrical signal from a sensor unit coupled to a production string or casing in a wellbore, the sensor unit having one or more sensors, the electrical signal indicative of a parameter measured by the one or more sensors; transmitting an acoustic signal by an electroacoustic transmitter coupled to the production string or casing, the acoustic signal correlated to the electrical signal, the acoustic signal transmitted via the production string or casing or fluid in the production string or casing; receiving the acoustic signal in an acoustic receiver coupled to the production string or casing above the electroacoustic transmitter with respect to fluid flow to a surface location, the acoustic receiver separated from the electroacoustic transmitter by a downhole connection that obstructs direct electrical transmission and optical transmission between the electroacoustic transmitter and the acoustic receiver; and providing data correlated to the received acoustic signal to the surface location of the wellbore.

A method 2 can include the elements of method 1 and can include providing data correlated to the received acoustic signal to the surface location of the wellbore to include using an optical fiber system to transmit the data to the surface location.

A method 3 can include the elements of method 2 or elements of method 1 and can include providing data correlated to the received acoustic signal to the surface location to include using a distributed acoustic sensing system that receives the data in acoustic form.

A method 4 can include the elements of method 3 or elements of any of methods 1 and 2 and can include using the distributed acoustic sensing system to include applying an interferometric technique.

A method 5 can include the elements of method 4 or elements of any of methods 1-3 and can include applying an interferometric technique to include using coherent Rayleigh scattering.

A method 6 can include the elements of method 3 or elements of any of methods 1-2 and 4-5 and can include receiving the acoustic signal in the acoustic receiver to include receiving the acoustic signal in an acoustic receiver coupled to the distributed acoustic sensing system.

A method 7 can include the elements of method 1 or elements of any of methods 1-6 and can include generating the electrical signal from a sensor unit and transmitting the acoustic signal to include transmitting the acoustic signal from the electroacoustic transmitter integrated in the sensor unit; and receiving the acoustic signal includes receiving the acoustic signal in an distributed acoustic sensing system separated from the sensor unit by the downhole connection in the production string or casing.

A method 8 can include the elements of method 7 or elements of any of methods 1-6 and can include converting an electrical signal, from a second sensor unit coupled to the sensor unit by electrical wiring, to an acoustic signal containing data from one or more sensors of the second sensor unit, and transmitting an acoustic signal containing the data from the one or more sensors of the second sensor unit across the downhole connection.

A method 9 can include the elements of method 1 or elements of any of methods 1-8 and can include powering the sensor unit by a vortex harvester that provides energy to the sensor unit from flow of fluid in the production string or casing.

A method 10 can include the elements of method 1 or elements of any of methods 1-9 and can include generating a plurality of acoustic signals from conversion of electrical signals by one or more additional sensor units coupled to the production string or casing, each additional sensor unit having one or more sensors, the electrical signals being generated at a frequency different from that of the other sensor units or the electrical signals being time multiplexed with a unique identifier for each electrical signal.

A method 11 can include the elements of method 1 or elements of any of methods 1-10 and can include receiving commands in the sensor unit to control the one or more sensors.

A system 1 can comprise: a sensor unit coupled to a production string or casing in a wellbore, the sensor unit having one or more sensors, the sensor unit operable to output an electrical signal indicative of a parameter measured by the one or more sensors; an electroacoustic transmitter coupled to the production string or casing in the wellbore and structured to transmit an acoustic signal via the production string or casing or fluid in the production string or casing, the acoustic signal correlated to the electrical signal; and an acoustic receiver coupled to the production string or casing above the electroacoustic transmitter with respect to fluid flow to a surface location, the acoustic receiver separated from the electroacoustic transmitter by a downhole connection that obstructs direct electrical transmission and optical transmission between the electroacoustic transmitter and the acoustic receiver, the acoustic receiver device operable to receive the acoustic signal.

A system 2 can include the elements of system 1 and can include the acoustic receiver to include an acoustic receiver arranged to amplify data in the acoustic signal and transmit the amplified data to an optical fiber system or a fiber optic sensor coupled to the optical fiber system.

A system 3 can include the elements of system 2 or elements of system 1 and can include the optical fiber system to include a distributed acoustic sensing system.

A system 4 can include the elements of system 3 or elements of any of systems 1-2 and can include the sensor unit to include a vortex harvester to provide energy to the sensor unit from flow of fluid in the production string or casing.

A system 5 can include the elements of system 4 or elements of any of systems 1-3 and can include the vortex harvester operable to detect fluid velocity.

A system 6 can include the elements of system 1 or elements of any of systems 2-5 and can include the one or more sensors to include temperature and pressure sensors.

A system 7 can include the elements of system 1 or elements of any of systems 2-6 and can include one or more additional sensor units, each additional sensor unit having one or more sensors, the one or more additional sensor units coupled to the production string or casing and arranged to provide electrical signals, having sensor data, to the electroacoustic transmitter for acoustic transmission of the sensor data across the downhole connection, the electrical signals being generated at a frequency different from that of the other sensor units or the electrical signals being time multiplexed with a unique identifier for each electrical signal.

A system 8 can include the elements of system 1 or elements of any of systems 2-7 and can include the acoustic receiver to include a distributed acoustic sensing system to receive the acoustic signal directly from the production string or casing or the fluid in the production string or casing.

A system 9 can include the elements of system 1 or elements of any of systems 2-8 and can include the electroacoustic transmitter electrically connected to the sensor unit to share an operating power source or the electroacoustic transmitter to include a vortex harvester to provide energy to the electroacoustic transmitter from flow of fluid in the production string or casing.

A system 10 can include the elements of system 1 or elements of any of systems 2-9 and can include the acoustic receiver to include a piezoelectric receiver to receive the acoustic signal and a piezoelectric transmitter to transmit a representation of the acoustic signal to a distributed acoustic sensing system.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
generating an electrical signal from a sensor unit coupled to a production string or casing in a wellbore, the sensor unit having one or more sensors, the electrical signal indicative of a parameter measured by the one or more sensors;
transmitting an acoustic signal by an electroacoustic transmitter coupled to the production string or casing, the acoustic signal correlated to the electrical signal, the acoustic signal transmitted via the production string or casing or fluid in the production string or casing;
receiving the acoustic signal in an acoustic receiver coupled to the production string or casing above the electroacoustic transmitter with respect to fluid flow to a surface location, the acoustic receiver separated from the electroacoustic transmitter by a downhole connection that obstructs direct electrical transmission and optical transmission between the electroacoustic transmitter and the acoustic receiver; and
providing data correlated to the received acoustic signal to the surface location of the wellbore.

2. The method of claim 1, wherein providing data correlated to the received acoustic signal to the surface location of the wellbore includes using an optical fiber system to transmit the data to the surface location.

3. The method of claim 2, wherein providing data correlated to the received acoustic signal to the surface location includes using a distributed acoustic sensing system that receives the data in acoustic form.

4. The method of claim 3, wherein using the distributed acoustic sensing system includes applying an interferometric technique.

5. The method of claim 4, wherein applying an interferometric technique includes using coherent Rayleigh scattering.

6. The method of claim 3, wherein receiving the acoustic signal in the acoustic receiver includes receiving the acoustic signal in an acoustic receiver coupled to the distributed acoustic sensing system.

7. The method of claim 1, wherein generating the electrical signal from a sensor unit and transmitting the acoustic signal includes transmitting the acoustic signal from the electroacoustic transmitter integrated in the sensor unit; and receiving the acoustic signal includes receiving the acoustic signal in an distributed acoustic sensing system separated from the sensor unit by the downhole connection in the production string or casing.

8. The method of claim 7, wherein the method includes converting an electrical signal, from a second sensor unit coupled to the sensor unit by electrical wiring, to an acoustic signal containing data from one or more sensors of the second sensor unit, and transmitting an acoustic signal containing the data from the one or more sensors of the second sensor unit across the downhole connection.

9. The method of claim 1, wherein the method includes powering the sensor unit by a vortex harvester that provides energy to the sensor unit from flow of fluid in the production string or casing.

10. The method of claim 1, wherein the method includes generating a plurality of acoustic signals from conversion of electrical signals by one or more additional sensor units coupled to the production string or casing, each additional sensor unit having one or more sensors, the electrical signals being generated at a frequency different from that of the other sensor units or the electrical signals being time multiplexed with a unique identifier for each electrical signal.

11. The method of claim 1, wherein the method includes receiving commands in the sensor unit to control the one or more sensors.

12. A system comprising:
a sensor unit coupled to a production string or casing in a wellbore, the sensor unit having one or more sensors, the sensor unit operable to output an electrical signal indicative of a parameter measured by the one or more sensors;
an electroacoustic transmitter coupled to the production string or casing in the wellbore and structured to transmit an acoustic signal via the production string or casing or fluid in the production string or casing, the acoustic signal correlated to the electrical signal; and
an acoustic receiver coupled to the production string or casing above the electroacoustic transmitter with respect to fluid flow to a surface location, the acoustic receiver separated from the electroacoustic transmitter by a downhole connection that obstructs direct electrical transmission and optical transmission between the electroacoustic transmitter and the acoustic receiver, the acoustic receiver device operable to receive the acoustic signal.

13. The system of claim 12, wherein the acoustic receiver includes an acoustic receiver arranged to amplify data in the acoustic signal and transmit the amplified data to an optical fiber system or a fiber optic sensor coupled to the optical fiber system.

14. The system of claim 13, wherein the optical fiber system includes a distributed acoustic sensing system.

15. The system of claim 14, wherein the sensor unit includes a vortex harvester to provide energy to the sensor unit from flow of fluid in the production string or casing.

16. The system of claim 15, wherein the vortex harvester is operable to detect fluid velocity.

17. The system of claim 12, wherein the one or more sensors include temperature and pressure sensors.

18. The system of claim 12, wherein the system includes one or more additional sensor units, each additional sensor unit having one or more sensors, the one or more additional sensor units coupled to the production string or casing and arranged to provide electrical signals, having sensor data, to the electroacoustic transmitter for acoustic transmission of the sensor data across the downhole connection, the electrical signals being generated at a frequency different from that of the other sensor units or the electrical signals being time multiplexed with a unique identifier for each electrical signal.

19. The system of claim 12, wherein the acoustic receiver includes a distributed acoustic sensing system to receive the acoustic signal directly from the production string or casing or the fluid in the production string or casing.

20. The system of claim 12, wherein the electroacoustic transmitter is electrically connected to the sensor unit to share an operating power source or the electroacoustic transmitter includes a vortex harvester to provide energy to the electroacoustic transmitter from flow of fluid in the production string or casing.

21. The system of claim 12, wherein the acoustic receiver includes a piezoelectric receiver to receive the acoustic signal and a piezoelectric transmitter to transmit a representation of the acoustic signal to a distributed acoustic sensing system.

* * * * *